United States Patent
Des Champs

(10) Patent No.: US 10,837,672 B1
(45) Date of Patent: *Nov. 17, 2020

(54) SYSTEMS, DEVICES, AND/OR METHODS FOR MANAGING CONDENSATE

(71) Applicant: Nicholas Howard Des Champs, Fincastle, VA (US)

(72) Inventor: Nicholas Howard Des Champs, Fincastle, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/819,895

(22) Filed: Mar. 16, 2020

Related U.S. Application Data

(63) Continuation of application No. 15/964,821, filed on Apr. 27, 2018, now Pat. No. 10,591,185.

(51) Int. Cl.
    *F24H 8/00* (2006.01)
    *F24H 9/16* (2006.01)

(52) U.S. Cl.
    CPC ............. *F24H 8/006* (2013.01); *F24H 9/165* (2013.01)

(58) Field of Classification Search
    CPC ....... F24H 8/006; F24H 9/165; Y02B 30/106; Y10T 137/3068; Y10T 137/5907
See application file for complete search history.

(56) References Cited

U.S. PATENT DOCUMENTS

| | | | |
|---|---|---|---|
| 2,277,647 A * | 3/1942 | Jones | F25B 1/053 62/199 |
| 4,527,584 A | 7/1985 | Miller | |
| 4,627,460 A | 12/1986 | Eising | |
| 5,644,935 A | 7/1997 | Chaves | |
| 6,009,898 A | 1/2000 | Risch | |
| 6,698,225 B2 | 3/2004 | Chaves | |
| 6,823,885 B2 | 11/2004 | Hotta | |
| 6,895,771 B1 | 5/2005 | Cantolino | |
| 6,931,882 B1 | 8/2005 | Yang | |
| 7,578,932 B2 | 8/2009 | Cantolino | |
| 7,854,238 B2 | 12/2010 | Zatarain | |
| 9,777,957 B1 | 10/2017 | Des Champs | |
| 10,488,088 B2 | 11/2019 | Verma | |
| 10,591,185 B1 | 3/2020 | Des Champs | |

FOREIGN PATENT DOCUMENTS

WO      WO18/034636      2/2018

\* cited by examiner

*Primary Examiner* — Alfred Basichas
(74) *Attorney, Agent, or Firm* — Michael N. Haynes PLC; Michael N. Haynes

(57) ABSTRACT

Certain exemplary embodiments can provide a system, machine, device, and/or manufacture that is configured for operably releasing condensate from a furnace combustion gas containment system without allowing a substantial quantity of drain air to enter the condensate producing system from a drain or a substantial quantity of combustion gas to flow through the system, machine, device, and/or manufacture.

17 Claims, 5 Drawing Sheets

SYSTEMS, DEVICES, AND/OR METHODS FOR MANAGING CONDENSATE

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1A:
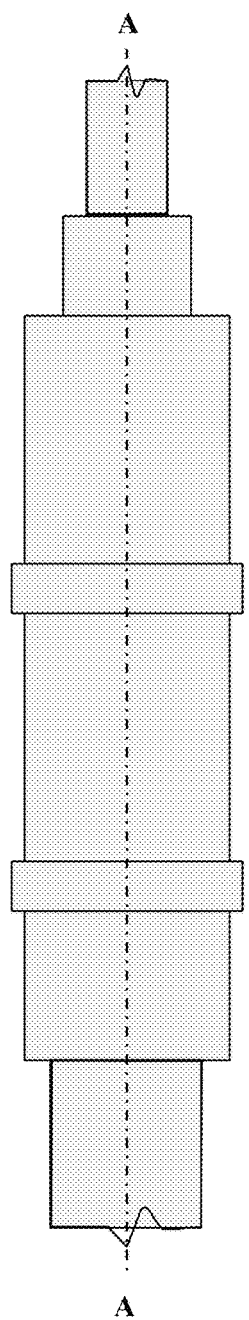
FIGS. 1A, 1B, and 1C illustrate a left side view, a front view, and a right side view, respectively, of exemplary embodiments of furnace trap 1000.

Certain exemplary embodiments relate to the technical field of heating, ventilating, and air conditioning ("HVAC"). Certain exemplary embodiments involve "traps" that allow condensate to drain from a condensate source, such as a piece of HVAC, ice-making, dehumidifying, and/or other condensate-producing equipment, and simultaneously prevent air from entering or escaping from the equipment.

As an example, certain exemplary embodiments involve gas furnaces, such as used for home heating, which can have a thermal efficiency greater than 90 percent. To achieve this high efficiency the combustion products typically must have latent energy as well as sensible energy removed and transferred to the recirculated air used to heat the space. The energy transfer process can take place first in a metal air-to-air heat exchanger, where approximately 70 percent of the energy can be removed, and then within a corrosion-resistant heat exchanger, or 2nd stage heat exchanger, where both sensible and latent energy can be removed from the cooler combustion products. When latent energy is removed from a gas stream, moisture can condense on the combustion air side of the heat transfer surface. This condensation typically collects at or near the outlet of the 2nd stage.

An induction fan can be necessary to induce the combustion products to flow through the first and second stage heat exchangers and then to blow the cooled combustion products through the vent tube to ambient. Because the temperature surrounding the vent tube can be lower than the dew point temperature of the combustion products, condensation also can form within the pressurized vent tube and/or tube. Thus, condensation can arise from two sources; the heat exchangers and the vent tube. Due to the action of the induction fan pulling combustion gases from the heat exchangers, condensate collected from the heat exchangers is often surrounded by a negative gas pressure (with respect to ambient air pressure and/or the pressure on the downstream side of the induction fan). Likewise, due to the action of the induction fan pushing combustion gases through the vent tube, condensate collected from the vent tube is often surrounded by a positive pressure (with respect to ambient and/or the upstream side of the induction fan).

The condensate formed within the 2nd stage condensing heat exchanger and/or from within the vent tube can be collected and/or directed to one or more condensate drains, which can be subject to ambient air pressure. To remove condensate from a combustion gas containment system, a device known as a "P-trap" can be used. When properly operating and serving a combustion gas containment system, a P-trap can allow condensate to exit the combustion gas containment system while preventing air from entering (when the combustion gas containment system is at negative pressure) or combustion gas from leaving (when the combustion gas containment system is at positive pressure).

There can be several challenges, however, with using a P-trap for this application:

standing water can be required within the P-trap and that water can be prone to freezing if the furnace is installed in an unheated space such as an attic or a cottage that sees intermittent use during winter;

in order to maintain a sufficient water level to allow the P-trap to operate properly at beginning of fall heating season, the trap typically must be very deep, which can lead to sludge buildup and/or an even greater chance of freezing; and/or designing two separate traps into a compact furnace design to handle the two condensate sources (one at a positive pressure and the other at a negative pressure) can be undesirable from the perspective of cost, space, installation, and/or maintenance, etc.

Our attempts to solve the problems associated with using P-traps for this application have presented several further challenges. For example, P-traps can require a relatively large reservoir of liquid stored within the trap in order to prevent air from entering or combustion gas from leaving the combustion gas containment system. This large amount of liquid, in many installations, can be prone to freezing. The resulting ice can prevent the furnace from restarting on call for heat, which can further result in the furnace never restarting and becoming useless for generating the heat to melt the ice.

As another example, when the furnace is first installed and/or at the beginning of a heating season, it is highly likely that the fluid in the reservoir is nonexistent or has receded to a level that permits combustion gas to flow from the positive pressure side of the combustion air fan, through the interstices of the trap, and into the negative gas side, entering at the lowest portion of the 2nd stage drain pan. Because the pressure differential between the gas entering and leaving these two flow points can be approximately 1.5 inches, the air flow entering the 2nd state drain pan can be sufficiently high that it can prevent condensate from exiting the pan. Instead of exiting, the condensate can form a small geyser, leading to condensate build up and/or spraying of water around the inner walls of the combustion chamber. This phenomenon can continue until the condensate arriving at the trap from the exhaust vent is sufficient to fill the trap to a level that prevents combustion air bypass within the trap. It is possible that the condensate level in the 2nd stage heat exchanger rises to a level that some of the tubes become filled, which can cause an increase in pressure drop leading to a decrease in combustion airflow. This in turn can shut down the furnace.

In other words, a catch-22 can exist with certain designs. The trap typically requires a certain level of water to be in trap at all times but the water can be prone to freezing.

Attempting to address this conundrum, we have conceived numerous trap designs in an attempt to achieve a more compact design by combining the negative and positive pressure capabilities into one trap. Other than those described below, none solves the freezing problem and each introduces new problems such as requiring a larger reservoir that contains no flowing water, which can lead to sediment accumulation and/or exacerbate the freezing problem. On initial startup or after several months of furnace inactivity, when there is insufficient water in the reservoir, a mixture of pressurized exhaust gas and ambient air can pass through the trap and/or be sucked into the negative pressure compartment. To reduce the airflow from the trap to the negative pressure drain pan downstream of the condensing heat exchanger, we have conceived designs that utilize an extremely narrow pathway within the trap from the positive pressure connection to the reservoir and from the negative inlet connection to the reservoir. Theoretically, this approach can restrict the flow of recirculated air so that condensate formed in the negative pressure drain pan can actually flow out of the pan to the trap instead of being blown up like a geyser by the rush of incoming gas from trap chamber or building-up in the heat exchanger drain pan, which could result in furnace shutdown. Yet such a purposely-designed tortuous flow path for the positive and negative pressure flow channels of the trap can lend itself to clogging by particulates from the products of combustion.

Certain exemplary embodiments can accomplish the functions desired for a furnace trap without encountering such challenges. Certain exemplary embodiments can deter or prevent:
- air from entering the combustion gas containment system;
- combustion gas from leaving the combustion gas containment system, and/or
- combustion gas from re-entering the negative side of the combustion gas containment system from the positive side.

Certain exemplary embodiments can provide a furnace trap that is configured to operate dry when the furnace is not operating. Certain exemplary embodiments can provide a furnace trap that, when the furnace is operating, allow condensate to flow from a point of condensate generation within the furnace, through the trap, and to a drain, such as a house gutter, a roof drain, and/or a ground level storm drain, while simultaneously deterring and/or not allowing combustion gases to flow out of the furnace's combustion gas containment system and/or to re-enter the furnace's combustion gas containment system from the high pressure side of the induction fan to the low pressure side of the induction fan.

Figure 1B:
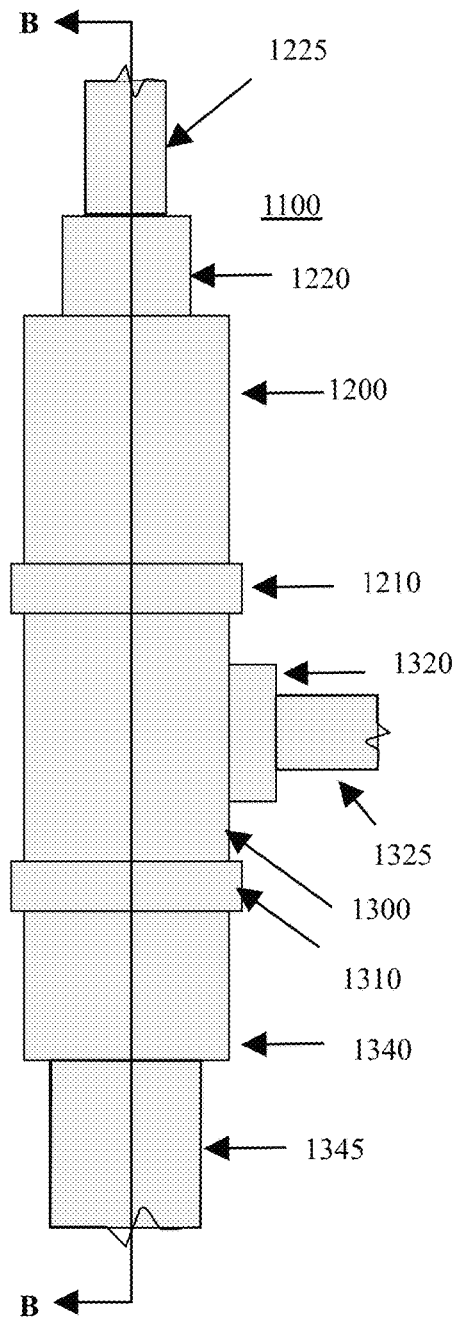
Figure 1C:
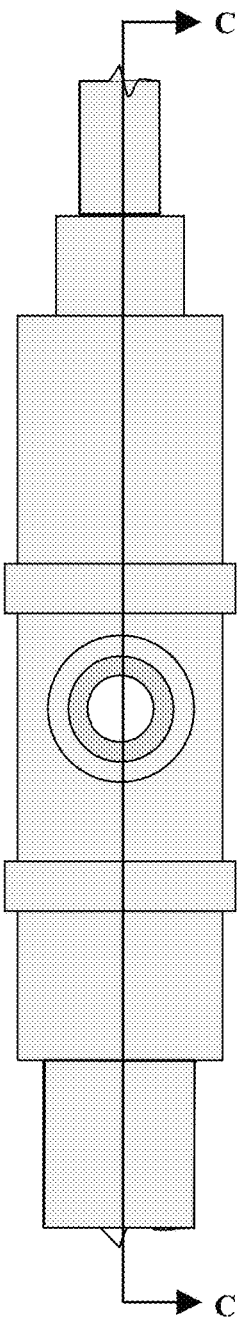

FIGS. 1A, 1B, 1C, 2, 3, 4, 5, and 6 illustrate various views of exemplary embodiments of a furnace trap 1000. As seen in FIG. 1B, trap 1000 can comprise an elongated, substantially vertically-extending body 1100, which can comprise a hollow upper body 1200 and a hollow lower body 1300. A vent tube condensate supply pipe 1225 can be substantially vertically coupled to upper body 1200 via a first inlet connection 1220. A heat exchanger condensate supply pipe 1325 can be substantially horizontally coupled to lower body 1300 via a second inlet connection 1320.

Condensate that enters body 1100 via vent tube condensate supply pipe 1225 or heat exchanger condensate supply pipe 1325 can exit body 1100 substantially downward to a drain via drain pipe 1345, which can be substantially vertically coupled to body 1100 via exit connection 1340. First inlet connection 1220 can be coupled to upper body 1200, which can be coupled to lower body 1300 via flange 1210. Lower body 1300 can be coupled to exit connection 1340 via flange 1310.

Figure 2:
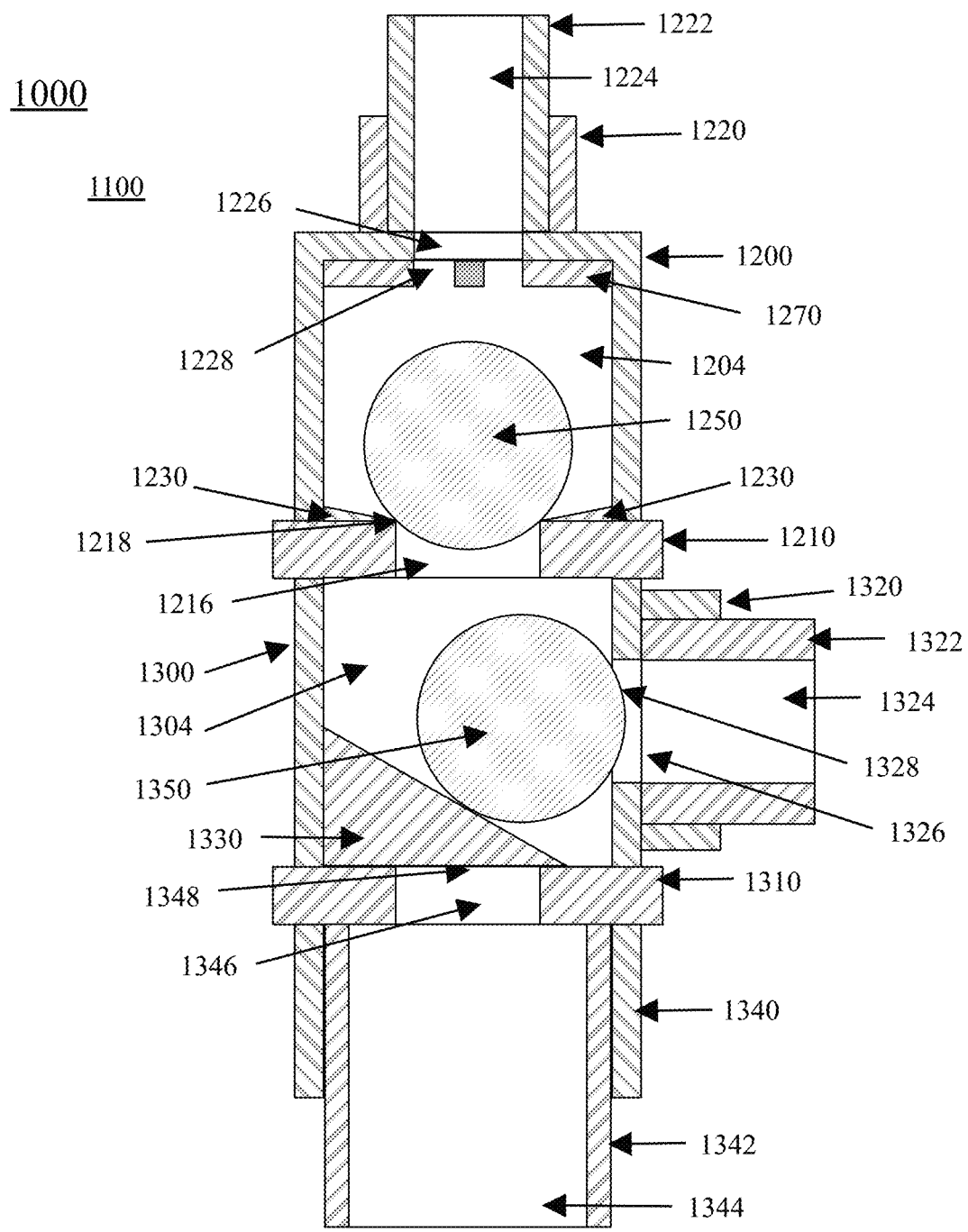
FIG. 2 is a cross-sectional view of certain exemplary embodiments of furnace trap 1000 taken at section C-C of FIG. 1C.
Figure 3:
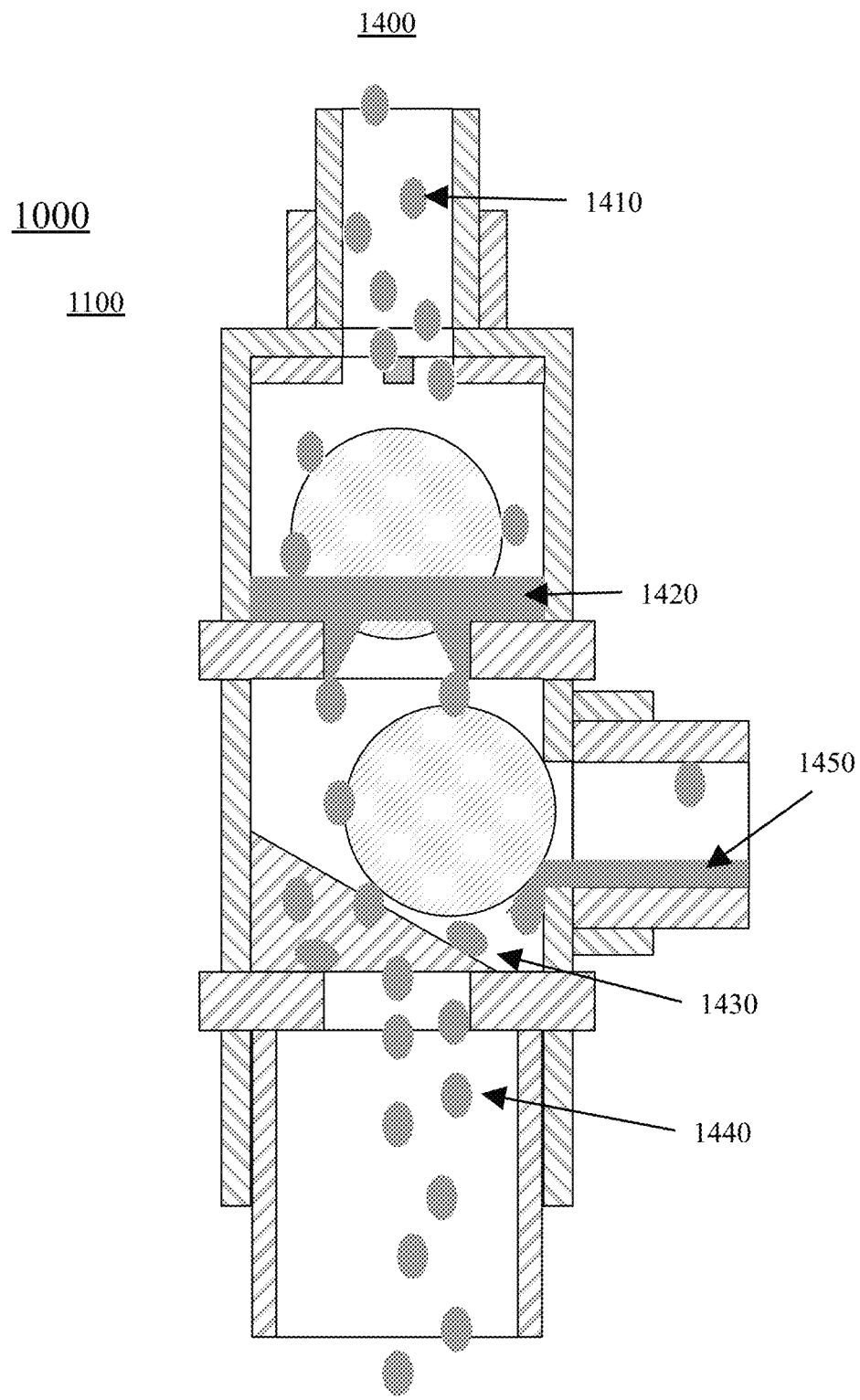
FIG. 3 is a cross-sectional view of certain exemplary embodiments of furnace trap 1000 taken at section C-C of FIG. 1C, and showing a potential flow of condensate within trap 1000.
Figure 4:
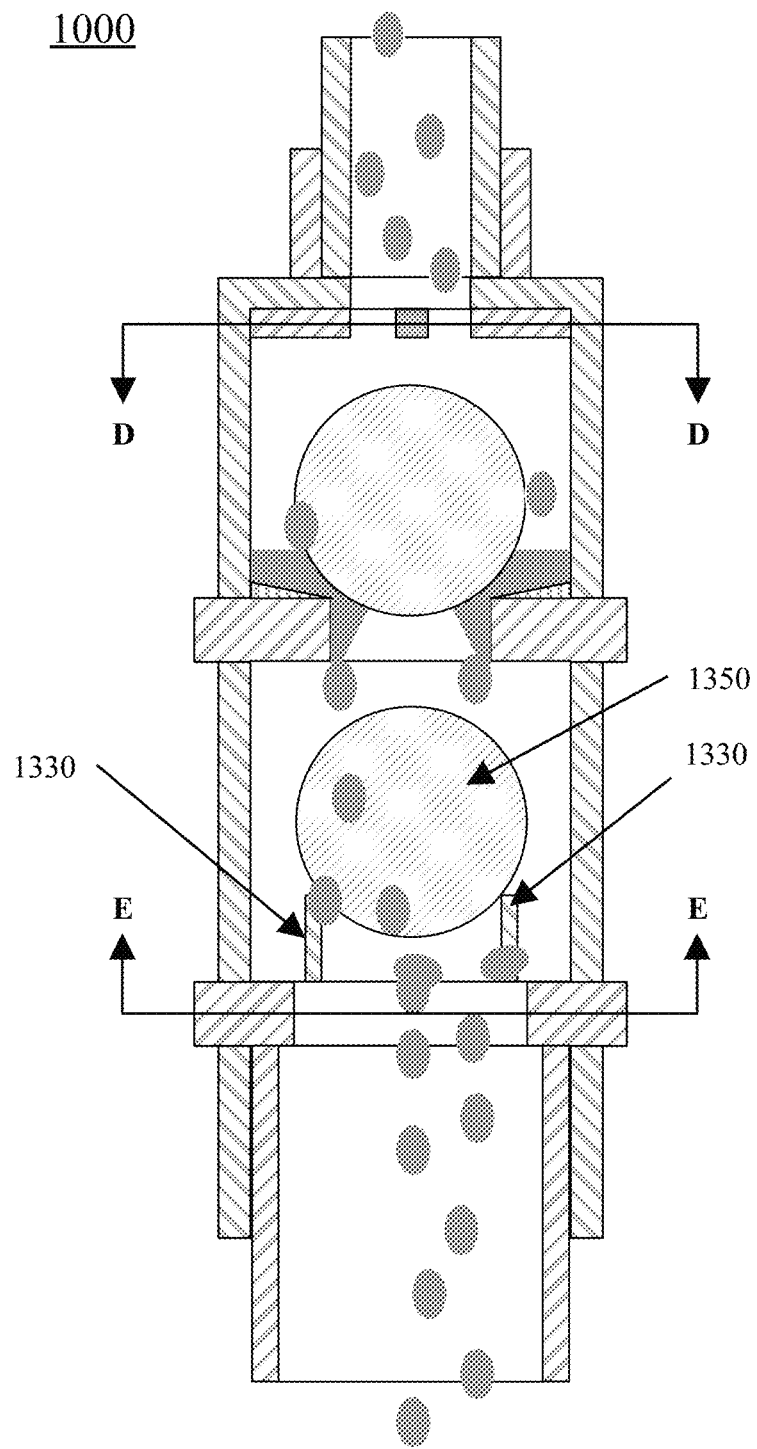
FIG. 4 is a cross-sectional view of certain exemplary embodiments of furnace trap 1000 taken at section B-B of FIG. 1B, and showing a potential flow of condensate within trap 1000.

FIG. 2 shows trap 1000 in a dry state, while FIG. 3 and FIG. 4 show trap 1000 while receiving condensate from the furnace. As seen in FIGS. 2, 3, and 4, heat exchanger condensate supply pipe 1222 can define an upper conduit 1224. Condensate 1400 from the combustion gas containment system, such as vent tube condensation 1410, can flow down from upper conduit 1224, through an inlet aperture or port 1226 formed in upper body 1200, and into an upper chamber 1204 that can be defined within upper body 1200. Condensation 1420 that accumulates in upper chamber 1204 can cause a buoyant and/or spherical upper float 1250 contained within upper chamber 1204 to rise off of upper chamber float seat 1218, which can be stationary, substantially smooth, substantially circular, and/or defined on an upper chamber-facing inner surface of upper body 1200. As float 1250 rises off of upper chamber float seat 1218, condensate 1420 can flow across upper chamber float seat 1218, through upper chamber aperture or port 1216, and into lower chamber 1304, which can be defined within lower body 1300, and which can contain a buoyant and/or spherical lower float 1350.

Heat exchanger condensation 1450 can flow from lower conduit 1324 defined within heat exchanger condensate supply pipe 1322, through lower chamber aperture or port 1326, across lower chamber float seat 1328, and into lower chamber 1304. Lower chamber float seat 1328 can be stationary, substantially smooth, substantially circular, and/or defined on a lower chamber-facing inner surface of lower body 1300.

Any condensate 1430 that flows into lower chamber 1304 can exit lower chamber 1304 by flowing across lower chamber bottom 1348, through lower chamber exit aperture or port 1346, and into drain conduit 1344, which can be defined by drain pipe 1342. Condensate 1440 in drain conduit 1344 can flow into a drain and/or drainage system (not shown).

As shown in FIG. 2, when little or substantially no condensate is present within trap 1000, gravity and/or positive pressure force operating on ball float 1250 can push an exterior surface of ball float 1250 into contact against upper chamber float seat 1218 and/or form an operative fluidic seal between float 1250 and seat 1218, and thereby substantially prevent combustion gases under a positive pressure from escaping through trap 1000 to the drain and/or substantially prevent drain gases from flowing from the drain, through trap 1000, and into the vent tube via the upper or vent tube condensate conduit 1224 or pipe 1222.

Likewise, when little or substantially no condensate is present within trap 1000, positive combustion gas pressure applied to chamber 1204, such as via upper conduit 1224, can press an exterior surface of ball float 1250 into contact against the upper chamber float seat 1218 and/or form an operative fluidic seal between float 1250 and seat 1218, and thereby substantially prevent combustion gases under a positive pressure from escaping through trap 1000 to the drain and/or substantially prevent drain gases from flowing from the drain, through trap 1000, and into the vent tube via the upper conduit 1224 or pipe 1222.

When little or substantially no condensate is present within trap 1000, a negative pressure applied to trap 1000 via lower or heat exchanger condensate conduit 1324 and/or heat exchanger condensate supply pipe 1322 can cause lower float 1350 to be pressed against lower chamber float seat 1328 and/or form an operative fluidic seal between float 1350 and seat 1328, and thereby substantially prevent pressurized combustion gas from the vent tube condensate supply pipe 1222 (and/or air from the drainage system) from being drawn into lower conduit 1324 and/or heat exchanger condensate supply pipe 1322 (and thus into the negative side of the combustion gas containment system).

Thus, with certain exemplary embodiments, trap 1000 can be configured such that when installed and operating in a substantially vertical orientation, when there is no condensate production there is substantially no standing water in trap body 1100, and when there is condensate production there is only water (and not combustion gases) that move through trap 1000 and/or into drain conduit 1344.

Figure 5:
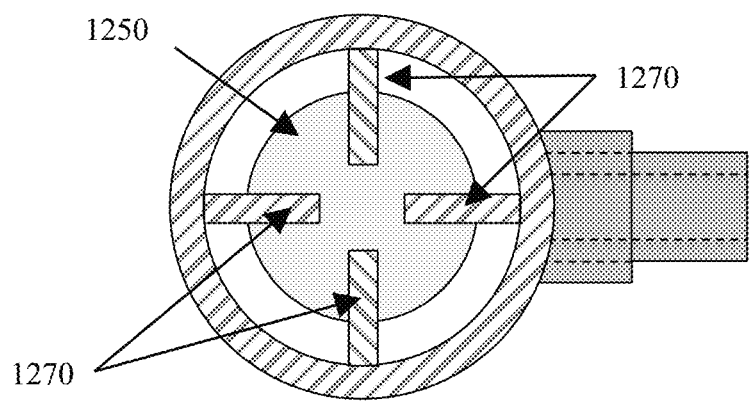
FIG. 5 is a cross-sectional view of certain exemplary embodiments of furnace trap 1000 taken at section D-D of FIG. 4.
Figure 6:
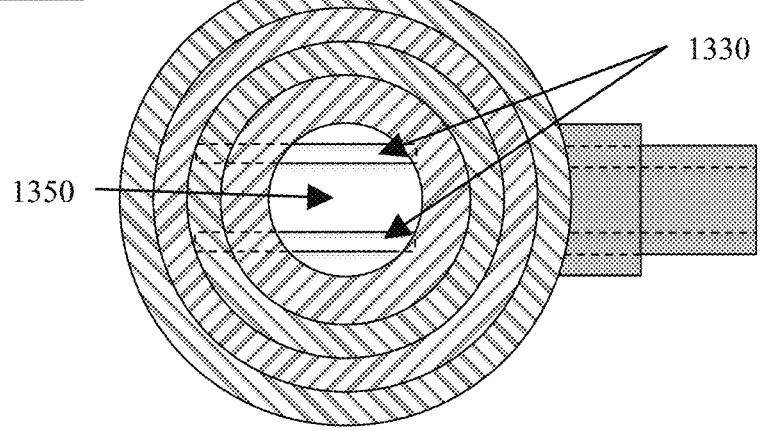
FIG. 6 is a cross-sectional view of certain exemplary embodiments of furnace trap 1000 taken at section E-E of FIG. 4.

FIG. 5 shows an exemplary embodiment of float stops 1270, which can serve to prevent upper float 1250 from undesirably seating in inlet aperture 1226, such as when condensate levels in chamber 1204 are exceptionally high.

FIGS. 2-6 show an exemplary embodiment of a plurality of float guides or rails 1330, which can:
- extend substantially planarly;
- extend substantially parallel to each other;
- incline generally downward from a lower chamber-facing inner surface of lower body 1300 and generally toward lower chamber float seat 1328;
- be integral to or removable from lower body 1300, and/or operatively:
  - bias lower float 1350 generally toward lower chamber float seat 1328 when lower chamber 1304 is experiencing a pressure higher than that in conduit 1324;
  - substantially prevent condensate 1450 from being blocked, resisted, and/or deterred from flowing from conduit 1324 and into lower chamber bottom 1348; and/or
  - allow condensate to exit lower chamber 1304 without substantial impediment while substantially preventing drain air and/or positively pressurized combustion gas from entering conduit 1324 and/or the negative side of the combustion gas containment system via heat exchanger condensate supply pipe 1322.

Certain exemplary embodiments can be configured such that there are essentially no pockets, nooks, and/or crannies for debris to accumulate within trap body 1100. For example, trap 1000 can be configured such that there is no standing water and/or debris is carried downward and into drain conduit 1344 with the water flow. The bottom of upper chamber 1204 can be sloped toward upper chamber float seat 1218 to encourage discharge of any debris with condensate 1420, and thereby substantially minimize the potential for debris accumulation near seat 1218 or within upper chamber 1204. Similarly, the bottom of lower chamber 1304 can be sloped toward lower chamber bottom 1348 to encourage discharge of any debris with condensate 1430, and thereby substantially minimize the potential for debris accumulation near seat 1348 or within lower chamber 1304.

With certain exemplary embodiments, there can be little or substantially no potential for the growth of algae because within the trap body 1100 there can be either only transient water or substantially no water, and thus the interior of the trap and its connecting piping can be essentially algae-free. Regarding debris, most can flow through trap 1000 with the condensate flow, but if some buildup does occur there can be a built in clean-out port located in or near the lower chamber 1304 that can allow the debris to be removed with, e.g., a water or air purge.

Any portion or component of trap 1000 can be constructed of a rubber, silicone, glass, ceramic, and/or polymer, such as a plastic, PVC, ABS, polycarbonate, glycine, etc. Any portion or component of trap 1000 can be formed by extrusion, casting, transfer molding, blow-molding, injection-molding, thermosetting, thermoforming, stamping, coating, depositing, curing, vacuum forming, milling, machining, cutting, etching, lithographic printing, joining, 3-D printing, and/or additive manufacturing, etc. Unless described otherwise, any portions or components of trap 1000 described herein as coupled can be connected via threading, friction fitting, solvent welding, gluing, caulking, soldering, brazing, compression fitting, and/or integration (i.e., formed as a single component), etc. Any portion or component of trap 1000 can have any level of opacity, where a low level of opacity for body 1100 can allow condensate and/or debris within trap 1000 to be observed, while a high level of opacity can hide them. Discussions herein of pressure are described with respect to ambient atmospheric pressure (e.g., approximately 14.7 psia at sea level).

Thus, certain exemplary embodiments can provide a furnace trap 1000 that is configured to operate dry when the furnace is not operating, and when the furnace is operating allow condensate to flow from the point of condensate generation within a furnace, without substantial impediment through trap 1000, and to a drain, while simultaneously not allowing combustion gases to flow through trap 1000.

Certain exemplary embodiments can provide a device configured to release condensate from a furnace combustion gas containment system, comprising:
- an elongated body defining;
  - an upper chamber configured to substantially contain an upper chamber float;
  - a lower chamber configured to substantially contain a lower chamber float;
  - a first port configured to direct condensate received from a first condensate conduit into the upper chamber;
  - a second port configured to direct condensate received from a second condensate conduit into the lower chamber;
  - a third port configured to direct condensate received from the upper chamber into the lower chamber; and/or
  - a fourth port configured to direct condensate received from the lower chamber into a drain conduit;
- one or more guide rails attached to or integral with the body and/or configured to operably bias the lower chamber float toward the second port;
- one or more guide rails attached to or integral with the body and/or configured to operably bias the lower chamber float toward the second port when condensate at the second port is below a predetermined level;
- one or more guide rails attached to or integral with the body and/or configured to operably bias the lower chamber float toward the second port pressure in the second conduit is below atmospheric pressure;
- one or more guide rails attached to or integral with the body and/or configured to operably direct the lower chamber float away from the second port when a sufficient amount of condensate is present at the second port;
- one or more guide rails attached to or integral with the body and/or configured to operably prevent the lower chamber float from blocking condensate from flowing through the fourth port; and/or one or more float stops attached to or integral with the body and/or configured to prevent the upper chamber float from preventing condensate from flowing through the first port;

wherein:

the upper chamber float is configured to allow condensate to flow out of the upper chamber through the third port and substantially prevent combustion gas from flow out of the upper chamber via the third port;

the lower chamber float is configured to substantially prevent combustion gas from flowing out of the lower chamber via the second port; and the lower chamber is configured to allow condensate to flow out of the lower chamber through the fourth port;

the upper chamber float is configured to operably form a fluidic seal with a stationary and substantially smooth third port seat defined on an upper chamber-facing inner surface of the body, the seal formed when substantially no condensate is present within the body;

the lower chamber float is configured to operably form a fluidic seal with a stationary and substantially smooth second port seat defined on a lower chamber-facing inner surface of the body, the seal formed when substantially no condensate is present at the second port;

the lower chamber float is configured to operably form a fluidic seal with a stationary and substantially smooth seat defined on a lower chamber-facing inner surface of the body, the seal formed when substantially no condensate is present at the second port and a relative pressure difference between;

the lower chamber float is configured to substantially prevent combustion gas from flowing out of the lower chamber and into the second condensate conduit;

the body is configured to substantially deter condensate from remaining in the upper chamber when condensate is not flowing into the upper chamber;

the body is configured to substantially deter condensate from remaining in the lower chamber when condensate is not flowing into the lower chamber;

the body is configured to operably deter debris from accumulating in the upper chamber when condensate is flowing through the third port;

the body is configured to operably deter debris from accumulating in the lower chamber when condensate is flowing through the fourth port;

the body is configured to substantially prevent drain gas from flowing into the second conduit; and/or the body is configured to operatively function when a longitudinal axis of the body is oriented substantially vertically.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
accumulate—to amass, collect, gather and/or become gathered together in an increasing quantity.
across—from one side to another.
activity—an action, act, step, and/or process or portion thereof
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
after—following in time and/or subsequent to.
against—in contact with so as to rest and/or press on, so as to come into forcible contact with, and/or contrary to and/or in a direction and/or course opposite to.
air—the earth's atmospheric gas.
allow—to provide, let do, happen, and/or permit.
along—through, on, beside, over, in line with, and/or parallel to the length and/or direction of; and/or from one end to the other of.
amount—a quantity.
an—at least one.
and—in conjuction with.
and/or—either in conjunction with or in alternative to.
annular—shaped like a ring.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
atmospheric pressure—the pressure exerted by the earth's atmosphere at any given point, being the product of the mass of the atmospheric column of the unit area above the given point and of the gravitational acceleration at the given point; typically approximately 14.7 psia.
attach—to fasten, secure, couple, and/or join.
away—on a path directed from a predetermined location.
axis—a straight line about which a body and/or geometric object rotates and/or can be conceived to rotate and/or a center line to which parts of a structure and/or body can be referred.
ball—a substantially spherical object.
based on—indicating one or more factors that affect a determination, but not necessarily foreclosing additional factors that might affect that determination.
below—beneath; in a lower place; and/or less than.
between—in a separating interval and/or intermediate to.
bias—n. a tension and/or force; v. to urge and/or force.
block—(n) an obstacle and/or the act of blocking; (v) to obstruct, stop and/or or impede the passage of and/or movement through; obstruct, and/or to prevent from happening, succeeding, and/or progressing.
body—a main and/or central part.
body—a main and/or central part.
by—via and/or with the use and/or help of
can—is capable of, in at least some embodiments.
cause—to bring about, provoke, precipitate, produce, elicit, be the reason for, result in, and/or effect.

cease—to halt and/or stop.

chamber—a space and/or compartment that is at least partially defined and surrounded by one or more objects.

chamber—a substantially enclosed space and/or compartment.

chamber-facing—having a surface that defines, is in contact with, and/or is adjacent to a chamber.

circuit—an electrically conductive pathway and/or a communications connection established across two or more switching devices comprised by a network and between corresponding end systems connected to, but not comprised by the network.

circular—having a cross-section of a circle and/or substantially resembling a round shape.

clean-out—an access for inspecting, reaching, and/or removing obstructions, debris, and/or contaminants; and/or a pipe fitting containing a removable plug that provides access for inspection and/or cleaning of the pipe run.

closable—able to be repeatedly closed.

close—to alter and/or move an object so that an opening and/or a passage is covered and/or obstructed by the object; to shut; and/or to draw and/or bind together.

combustion—the chemical action resulting from the direct combination of oxygen gas, generally in air, with a combustible material accompanied by the evolution of heat and light.

composition of matter—a combination, reaction product, compound, mixture, formulation, material, and/or composite formed by a human and/or automation from two or more substances and/or elements.

comprising—including but not limited to, what follows.

conceive—to imagine, conceptualize, form, and/or develop in the mind.

condensate—material derived by a change in physical state from a vapor to a liquid.

condensate—the liquid resulting from condensation of a gas, such as an aqueous solution that condenses from a furnace combustion gas.

conduit—a tube, channel, and/or duct for substantially enclosing electric wires and/or cable.

configure—to design, arrange, set up, shape, and/or make suitable and/or fit for a specific purpose, function, use, and/or situation.

configured to—having a structure that, during operation, will perform the indicated activity(ies). To the extent relevant to the current application, the use of "configured to" is expressly not intended to invoke 35 U.S.C. § 112(f) for that structure.

connect—to join or fasten together.

contact—to physically touch and/or come together.

contain—to store, restrain, hold, and/or keep within limits.

containment—the act of containing, keeping from spreading, and/or directing the flow, motion, and/or spread of.

convert—to transform, adapt, and/or change.

convey—to transmit, transport, guide, and/or carry.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

create—to bring into being.

debris—a solid substance and/or the remains of something destroyed, disintegrated, and/or decayed.

debris—a solid substance.

define—to establish the meaning, relationship, outline, form, and/or structure of; and/or to precisely and/or distinctly describe and/or specify.

derive—to receive, obtain, and/or produce from a source and/or origin.

deter—to hamper, hinder, delay, interrupt, interfere, oppose, restrict, retard, impede, stop, and/or prevent from doing, acting, happening, and/or progressing.

determine—to find out, obtain, calculate, decide, deduce, ascertain, and/or come to a decision, typically by investigation, reasoning, and/or calculation.

device—a machine, manufacture, and/or collection thereof.

difference—a value obtained via a subtraction of a first quantity from a second quantity.

direct—to point, aim, control, cause, provide instruction to, send toward a place and/or object, and/or cause to move in or follow a predetermined course.

direction—a spatial relation between something and a course along which it points and/or moves; a distance independent relationship between two points in space that specifies the position of either with respect to the other; and/or a relationship by which the alignment and/or orientation of any position with respect to any other position is established.

disconnect—to unattach and/or sever a connection.

drain—(n) a pipe and/or channel that carries off water, liquid, slurry, waste, sewage, etc.; (v) to empty, cause liquid to go out from, draw off (a liquid) by a gradual process, and/or become empty by the drawing off of liquid.

each—every one of a group considered individually.

effective—sufficient to bring about, provoke, elicit, and/or cause.

elongated—drawn out, made spatially longer, and/or having more length than width.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

exit—(n) a path, passage, and/or way leading through an opening and away from an interior of a container; (v) to leave, go away, and/or flow out of.

exterior—a region that is outside of a device and/or system.

extrude—to shape (a plastic, for instance) by forcing it through a die.

first—a label for a referenced element in one or more patent claims, but that label does not necessarily imply any type of ordering to how that element (or any other elements of a similar type) is implemented in embodiments of the claimed subject matter.

float—(n) a buoyant object; (v) to cause to and/or to remain suspended within and/or on the surface of a fluid without sinking.

flow—(n) a stream and/or current; (v) to move and/or run smoothly with unbroken continuity, as in the manner characteristic of a fluid.

flow—(n) the act of flowing, a continuous transfer, and/or a stream and/or current; (v) to pour forth, issue in a stream, and/or move and/or run smoothly with unbroken continuity, as in the manner characteristic of a fluid.

flowrate—a measure how much flows over a given time period.

fluid—a liquid, slurry, vapor, mist, cloud, plume, and/or foam, etc.

fluidic—of, relating to, or characteristic of a fluid.

for—with a purpose of form—(v) to construct, build, generate, and/or create; (n) a phase, structure, and/or appearance.

fourth—a label for an element in one or more patent claims, the element other than a "first" or "second" or "third" referenced element of a similar type, but the label does not necessarily imply any type of ordering to how that "fourth" element is implemented in embodiments of the claimed subject matter.

from—used to indicate a source, origin, and/or location thereof.

function—to perform as designed when applied.

furnace—a chamber, enclosure, or other holding means for heating materials therein.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

given— guide—to direct, steer, and/or exert control and/or influence over; and/or a passive structure configured to direct, resist, and/or prevent the movement of something.

having—including but not limited to.

horizontal—parallel to and/or in the plane of the horizon.

including—including but not limited to.

initialize—to prepare something for use and/or some future event.

inner—closer than another to the center and/or middle.

install—to connect or set in position and prepare for use.

integral—formed and/or united into another entity.

into—toward, in the direction of, and/or to the inside of.

is—to exist in actuality.

level—a relative position on a scale and/or a position along a vertical axis indicating height and/or depth.

longitudinal axis—a straight line defined parallel to an object's length and passing through a centroid of the object.

lower—in a position below something else and/or lesser in elevation in relation to something else.

mating—one of a matched pair.

may—is allowed and/or permitted to, in at least some embodiments.

method—one or more acts that are performed upon subject matter to be transformed to a different state or thing and/or are tied to a particular apparatus, said one or more acts not a fundamental principal and not pre-empting all uses of a fundamental principal.

more—a quantifier meaning greater in size, amount, extent, and/or degree.

near—a distance of less than approximately [X].

no—an absence of and/or lacking any.

non-destructively—of, relating to, or being a process that does not result in damage to the subject material and/or product and/or results in such minimal damage that the subject material and/or product can be re-used for its intended purpose.

not—a negation of something.

one—being and/or amounting to a single unit, individual, and/or entire thing, item, and/or object.

open—(v) to interrupt, to release from a closed and/or fastened position, to remove obstructions from, to clear, and/or to electrically decouple in a manner to create a gap across which electrical energy cannot readily flow; (adj) not substantially obstructed and/or not closed.

openable—able to be opened.

opening—an open space serving as an aperture, passage, or gap, operable—practicable and/or fit, ready, and/or configured to be put into its intended use and/or service.

operably—when operating and/or in effect for its intended use and/or service.

operative—when in operation for its intended use and/or service.

or—a conjunction used to indicate alternatives, typically appearing only before the last item in a group of alternative items.

orient—to position a first object relative to a second object.

other—a different and/or distinct entity and/or not the same as already mentioned and/or implied.

out—in a direction away from the inside, center, and/or middle, such as a container and/or source.

outside—beyond a range, boundary, and/or limit; and/or not within.

part—a component.

per—for each and/or by means of.

pipe—a hollow cylinder and/or tube used to conduct a liquid, gas, and/or finely divided solid.

plurality—the state of being plural and/or more than one.

port—an opening for the insertion and/or passage of an object and/or fluid.

portion—a part, component, section, percentage, ratio, and/or quantity that is less than a larger whole.

pre-—a prefix that precedes an activity that has occurred beforehand and/or in advance.

predetermine—to determine, decide, and/or establish in advance.

present—existing.

pressure—a measure of force applied uniformly over a surface.

prevent—to impede, resist, hinder, avert, deter, stop, and/or keep from happening.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

rail—a guide, running surface, bar, and/or member configured for supporting and/or guiding another thing.

range—a measure of an extent of a set of values and/or an amount and/or extent of variation.

ratio—a relationship between two quantities expressed as a quotient of one divided by the other.

receive—to gather, take, acquire, obtain, accept, get, and/or have bestowed upon.

recommend—to suggest, praise, commend, and/or endorse.

reduce—to make and/or become lesser and/or smaller.

relative—considered with reference to and/or in comparison to something else.
release—to let go and/or free from something that restrains, binds, fastens, and/or holds back.
remain—to continue to be in the same place; to stay or stay behind; and/or to be left after the removal, loss, passage, or destruction of other.
remove—to eliminate, remove, and/or delete, and/or to move from a place or position occupied.
repeat—to do again and/or perform again.
repeatedly—again and again; repetitively.
request—to express a desire for and/or ask for.
result—(n.) an outcome and/or consequence of a particular action, operation, and/or course; (v.) to cause an outcome and/or consequence of a particular action, operation, and/or course.
retain—to restrain, keep, and/or hold.
ring—a substantially toroidal object which can be imagined as having been generated by rotating a closed loop (e.g., ellipse, circle, irregular curve, polygon, etc.) about a fixed line external to the loop.
said—when used in a system or device claim, an article indicating a subsequent claim term that has been previously introduced.
seal—(v.) to shut close; to keep close; to make fast; to keep secure; to prevent leakage; (n.) a device configured to shut close; to keep close; to make fast; to keep secure; and/or to prevent leakage.
seat—(n) a sealing, supporting, and/or mating surface; (v) to attach to, seal against, support with, and/or bring firmly into contact with.
second—a label for an element in one or more patent claims, the element other than a "first" referenced element of a similar type, but the label does not necessarily imply any type of ordering to how that "second" element or the "first" element is implemented in embodiments of the claimed subject matter.
select—to make a choice or selection from alternatives.
set—a related plurality.
slope—(v) to position at an angle and/or incline with respect to vertical or horizontal; (n) an inclined line, surface, plane, position, and/or direction; and/or with respect to a first point and a second point that are intersected by a straight line, a ratio of the change in the ordinal value from the first point to the second point, to the change in the abscissal value from the first point to the second point; and/or a measure of a degree of inclination; and/or a rate of change.
smooth—lacking substantial surface irregularities, roughness, and/or projections.
source—a point and/or thing at or from which something originates, springs into being, and/or from which it derives and/or is obtained.
species—a class of individuals and/or objects grouped by virtue of their common attributes and assigned a common name; a division subordinate to a genus.
spherical—having the shape of, or substantially resembling, a sphere.
stationary—substantially fixed with respect to an object of reference.
stop—(n) a device or means that obstructs, blocks, deters, and/or plugs up; (v) to interrupt, cease and/or end, and/or to block and/or prevent the flow or passage of.
store—to place, hold, and/or retain data, typically in a memory.
stream—a flow of water and/or other fluid
substantially—to a considerable, large, and/or great, but not necessarily whole and/or entire, extent and/or degree.
such that—in a manner that results in.
sufficient—a degree and/or amount necessary to achieve a predetermined result.
support—to bear the weight of, especially from below.
surface—an outer boundary of a body, object, and/or thing and/or any material layer and/or face constituting and/or resembling such a boundary.
system—a collection of mechanisms, devices, machines, articles of manufacture, processes, data, and/or instructions, the collection designed to perform one or more specific functions.
that—used as the subject or object of a relative clause.
therein—within.
third—a label for an element in one or more patent claims, the element other than a "first" or "second" referenced element of a similar type, but the label does not necessarily imply any type of ordering to how that "third" element is implemented in embodiments of the claimed subject matter.
through—across, among, between, and/or in one side and out the opposite and/or another side of
to—a preposition adapted for use for expressing purpose.
toward—used to indicate a destination and/or in a physical and/or logical direction of.
transform—to change in measurable: form, appearance, nature, and/or character.
transmit—to send as a signal, provide, furnish, and/or supply.
trap—a device configured for sealing a passage against the escape of gases.
treatment—an act, manner, or method of handling and/or dealing with someone and/or something.
two—a cardinal number equal to one plus one.
upon—immediately or very soon after; and/or on the occasion of.
upper—in a high position relative to something else.
use—to put into service.
vertical—substantially perpendicular to horizontal.
via—by way of, with, and/or utilizing.
volume—a mass and/or a three-dimensional region that an object and/or substance occupies.
wall—a partition, structure, and/or mass that serves to enclose, divide, separate, segregate, define, and/or protect a volume.
weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.
when—at a time and/or during the time at which.
wherein—in regard to which; and; and/or in addition to.
with—accompanied by.
with regard to—about, regarding, relative to, and/or in relation to.
with respect to—about, regarding, relative to, and/or in relation to.
within—inside the limits of.
without—not accompanied by.
zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A device configured to release liquid, comprising:
a body defining;
   an upper chamber configured to substantially contain an upper chamber float;
   a lower chamber configured to substantially contain a lower chamber float;
   a first port configured to direct liquid received from a first conduit into the upper chamber;
   a second port configured to direct liquid received from a second conduit into the lower chamber;
   a third port configured to direct liquid received from the upper chamber into the lower chamber; and
   a fourth port configured to direct liquid received from the lower chamber into a drain conduit;
wherein:
   the upper chamber float is configured to allow liquid to flow out of the upper chamber through the third port;
   the lower chamber float is configured to substantially prevent gas from flowing out of the lower chamber via the second port; and
   the lower chamber is configured to allow liquid to flow out of the lower chamber through the fourth port.

2. The device of claim 1, wherein:
the upper chamber float is configured to operably form a fluidic seal with a stationary and substantially smooth third port seat defined on an upper inner surface of the body, the seal formed when substantially no liquid is present within the body.

3. The device of claim 1, wherein:
the lower chamber float is configured to operably form a fluidic seal with a stationary and substantially smooth second port seat defined on a lower inner surface of the body, the seal formed when substantially no liquid is present at the second port.

4. The device of claim 1, wherein:
the lower chamber float is configured to operably form a fluidic seal with a stationary and substantially smooth seat defined on a lower inner surface of the body, the seal formed when substantially no condensate is present at the second port and a relative pressure difference between second port and lower chamber is negative.

5. The device of claim 1, further comprising:
one or more guide rails attached to or integral with the body and configured to operably bias the lower chamber float toward the second port.

6. The device of claim 1, further comprising:
one or more guide rails attached to or integral with the body and configured to operably bias the lower chamber float toward the second port when liquid at the second port is below a predetermined level.

7. The device of claim 1, further comprising:
one or more guide rails attached to or integral with the body and configured to operably bias the lower chamber float toward the second port when pressure in the second conduit is below atmospheric pressure.

8. The device of claim 1, further comprising:
one or more guide rails attached to or integral with the body and configured to operably direct the lower chamber float away from the second port when a sufficient amount of liquid is present at the second port.

9. The device of claim 1, further comprising:
one or more guide rails attached to or integral with the body and configured to operably prevent the lower chamber float from blocking liquid from flowing through the fourth port.

10. The device of claim 1, wherein:
the lower chamber float is configured to substantially prevent gas from flowing out of the lower chamber and into the second conduit.

11. The device of claim 1, wherein:
the body is configured to substantially deter liquid from remaining in the upper chamber when liquid is not flowing into the upper chamber.

12. The device of claim 1, wherein:
the body is configured to substantially deter liquid from remaining in the lower chamber when liquid is not flowing into the lower chamber.

13. The device of claim 1, wherein:
the body is configured to operably deter debris from accumulating in the upper chamber when liquid is flowing through the third port.

14. The device of claim 1, wherein:
the body is configured to operably deter debris from accumulating in the lower chamber when liquid is flowing through the fourth port.

15. The device of claim 1, wherein:
the body is configured to substantially prevent drain gas from flowing into the second conduit.

16. The device of claim 1, wherein:
the body is configured to operatively function when a longitudinal axis of the body is oriented substantially vertically.

17. The device of claim 1, further comprising:
one or more float stops attached to or integral with the body and configured to prevent the upper chamber float from preventing liquid from flowing through the first port.

* * * * *